Aug. 15, 1950     A. B. ROESSLER, JR     2,518,819
LETHAL ANIMAL TRAP
Filed Jan. 27, 1948
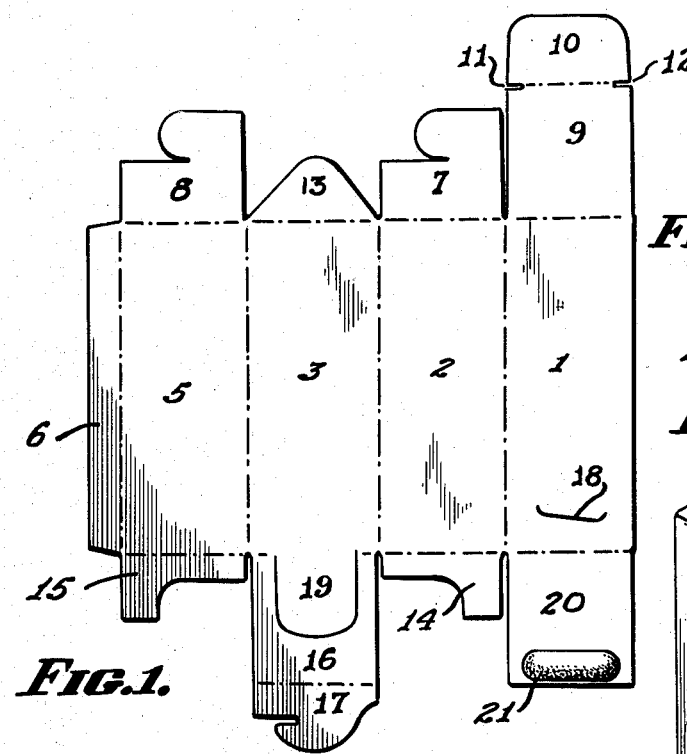
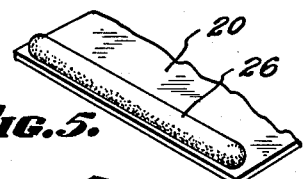
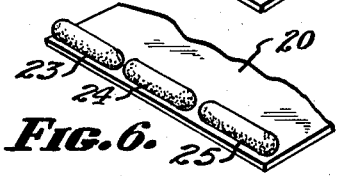
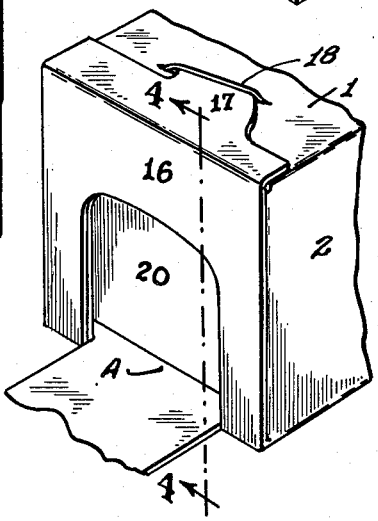
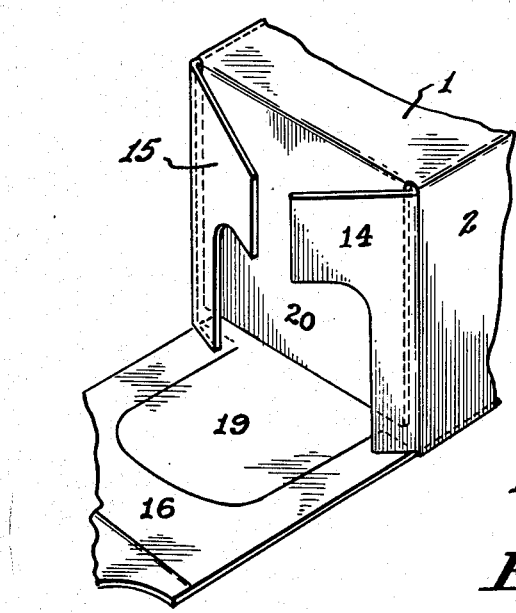
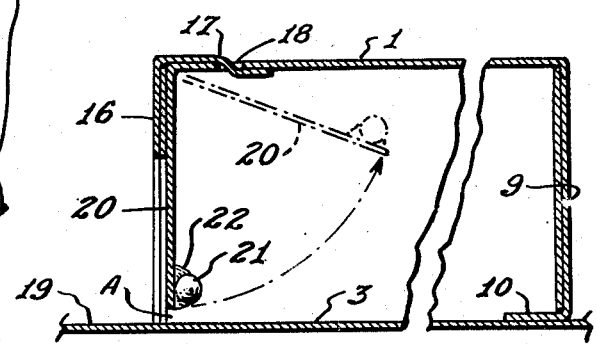
INVENTOR.
ALBERT B. ROESSLER, JR.
BY
ATTORNEYS.

Patented Aug. 15, 1950

2,518,819

UNITED STATES PATENT OFFICE 2,518,819

LETHAL ANIMAL TRAP

Albert B. Roessler, Jr., North College Hill, Ohio

Application January 27, 1948, Serial No. 4,618

3 Claims. (Cl. 43—61)

My invention relates to the problem of killing a trapped animal quickly and humanely, before it has had an opportunity to escape from the trap. While its utility is not limited to any particular trap construction, it is especially applicable to and will herein be described in connection with a paperboard trap for small animals such as that set forth in the co-pending application of Robert B. Worfford, Serial No. 791,433, filed December 12, 1947 and entitled Paperboard Animal Trap.

Worfford has developed a paperboard trap for small animals such as rats and mice, the trap comprising a paperboard carton with an access opening for the animal, which opening is closed by a resilient flap. The animal is induced to enter the structure by the use of suitable bait, and his egress is then obstructed by the resilient flap which has returned to a position blocking the access opening. Such a trap is intended for one-time use, and is disposable along with the body of the trapped animal. It has a number of important advantages, in that the danger involved in the setting of spring structures is eliminated, and the user is not required to handle directly the body of the trapped rodent nor to handle trap mechanism which has been in contact with the body.

Where the trap is made of ordinary paperboard, it will not however indefinitely retain a live animal, since an active rodent can in time gnaw its way out of the structure. The sanitary and disposable features of the trap, as well as its effectiveness, thus depend upon killing the animal within the trap before it can free itself. It was contemplated that the trap would be used with a bait containing an active poison; and this is fully operative.

In the merchandising and use of these structures there is danger and a number of inherent difficulties in the provision and handling of poisoned baits. It is difficult, and in some cases impossible, for the trap user to secure a supply of poison, to say nothing of the danger of keeping such a supply in his household. There are difficulties in the merchandising of prebaited traps, and especially in continuously maintaining the effectiveness of the bait. Even so, danger is involved since a child or large animal such as a cat or dog can tear the trap apart from the outside and become affected by the poisoned bait.

The fundamental objects of my invention are the provision of solutions for the difficulties set forth above.

It is an object of my invention to provide a means, as an inherent part of the trap, for killing the trapped animal quickly and humanely, before it can effect its escape from the trap.

One of my objects is the provision of a lethal means distinct from the bait, so that the user can employ at his convenience any available non-poisoned bait.

It is an object of my invention to provide a lethal means which can economically be incorporated in the trap structure by the manufacturer or merchandiser and prior to its sale to the user.

It is an object of my invention to provide a lethal means which will be effective in killing an animal only if the animal is located within the trap, but which will be harmless to human beings and animals located outside the trap, even if they destroy the trap and release or consume the lethal means.

These and other objects of the invention which will be set forth hereinafter or will be apparent to one skilled in the art upon reading these specifications, I accomplish by that means, and by that construction and arrangement of parts of which I shall now describe the aforesaid exemplary embodiment. Reference is made to the accompanying drawings wherein:

Figure 1 is a plan view of the blank for the exemplary paperboard trap referred to above.

Figure 2 is a partial perspective view of the entrance end of the trap in incompletely set-up condition.

Figure 3 is a partial perspective view of the entrance end of the trap in fully set-up condition.

Figure 4 is a sectional view taken along the section line 4—4 of Figure 3.

Figure 5 is a partial perspective view of a resilient flap for a trap of larger size showing one arrangement of the lethal means.

Figure 6 is a partial perspective view of a similar resilient flap for a larger trap showing another arrangement of the lethal means.

Referring to Figure 1, I have shown the paperboard blank for the exemplary trap, as presenting a series of body walls 1, 2, 3 and 5 and a glue flap 6 in articulation. Solid lines represent lines of cut and dot-dash lines represent lines of score. At the top of the blank walls 2 and 5 have interlocking closure flaps 7 and 8, while wall 1 has a closure flap 9 and a tuck flap 10, the latter being provided with notches 11 and 12, coacting in the closed and erected structure with edge portions of flaps 7 and 8, to provide a further lock for the structure. The body wall 3 terminates in an extension 13 which may be employed, in connection with a thumb-tack or the like, to fasten the erected trap to a support in such a way as to prevent its movement and to resist the force exerted by the animal in entering the trap.

At the bottom of the blank, body walls 2 and 5 are provided with a pair of short flaps 14 and 15, cut away as shown, so that when these flaps come together across the end of the carton, the cut way portions will provide an access opening. Body wall 3 is provided with a closure flap 16 and a locking tongue or extension 17 which can be engaged in a slit 18 in body wall 1. A U-shaped cut in the flap 16 provides an access opening, and demarks a tab 19 which, projecting from the body wall 3, provides an additional means whereby the trap may be anchored to a support such as a floor. When the trap is in use, body wall 3 forms the bottom of the structure. Body wall 1 is provided with a flap 20 which is the resilient flap referred to above. This flap is relieved at its edges and end in such a way that, while it serves to close the end of the body of the carton, it is freely swingable within it, and may be displaced by an animal upon entering the trap. In closing the access end of the trap, flap 20 is first folded inwardly, and flaps 14 and 15 are folded over it as will be apparent from Figure 2. Then flap 16 is folded into closure position and its locking tongue 17 engaged in the slit 18 as will be apparent from Figure 3. A small animal can enter this trap by displacing the flap 20, but once the animal is inside this flap returns to closure position, preventing the egress of the animal.

The trap structure thus far described may be made in various sizes appropriate to the classes of animals involved, and in various weights of boxboard. The manufacture of the blank will be in accordance with usual paperboard carton technique; and when the blank has been formed as illustrated in Figure 1, it will be tubed as is customary in paperboard carton manufacture, by being sent through the usual carton folding and gluing equipment. The tubing is accomplished by bending or folding the blank along score lines such as the ones intermediate body walls 3 and 5 and body walls 1 and 2, accompanied by the adhesive union of glue flap 6 to the free marginal portion of the body wall 1. The collapsed or knocked down carton may then be shipped to the users or to various distributing points for sale to users, at which points they may be provided with the lethal means hereinafter described, and erected for resale.

If such traps are employed with non-poisoned bait, the trapped animal will make efforts to free itself. It has been ascertained that these efforts invariably take the form of an attack on the resilient flap 20 and on parts adjacent this flap. This is believed to be due to the fact that the animal within the trap sees light and an opening from the trap only in the area A in Figure 3 where the bottom edge of the flap 20 lies above the plane of the bottom body wall 3. It has been ascertained that an active rodent such as a mouse can gnaw its way out of a paperboard trap in a minimum length of time of about twenty minutes, so that whatever lethal means is employed must be effective in killing the animal, or at least in seriously impairing its activity within this length of time.

A primary feature of this invention lies in the attachment to the inside lower marginal portion of the resilient flap 20 of a material capable of inducing death. The material when so located is in such a position that it must be attacked by the animal in its efforts to free itself, since, as pointed out above, these efforts invariably involve an attack on the flap 20 adjacent the area A. In the preferred form of my invention, however, I do not employ a poison in the sense of a material which, if consumed, would produce death or disability by chemical interaction with the blood stream or otherwise. On the contrary I take advantage of the fact that the trapped animal is completely enclosed in a box having little, if any, atmospheric interchange with the outer air; and I employ preferably a material which will produce anaesthesia and ultimate death if continuously breathed by the animal in heavy concentration. There is a wide variety of materials which if continuously breathed in the form of concentrated vapors will produce anaesthesia and ultimate death, but which are non-lethal if taken internally and completely harmless if released in small quantity to the outer air. Chloroform and ether are the most commercially available of such substances and will serve as examples.

Small quantities of such substances may be enclosed in puncturable containers such as capsules, and such a capsule may be cemented to the lower inner edge of flap 20 as indicated at 21 in Figures 1 and 4. This may be done by means of any suitable adhesive 22. The nature of the capsule is not a limitation on the invention. Chloroform and ether, being non-solvents for gelatin, may be enclosed in sealed gelatin capsules which are quite soft and are readily punctured by the teeth of rodents. In the case of a trap for ordinary household mice, in which the resilient flap 20 will have longitudinal and lateral dimensions of approximately one and one-half inches, a single capsule 21 of a size for oral administration to human beings may be employed, and can be so positioned along the lower inner edge of the flap 20 that a mouse can not gnaw away a sufficient area of this flap to effect escape without destroying the capsule and releasing its contents. In the case of larger trap structures as for example a rat trap having a flap 20 approximately 3 inches in both dimensions, a series of capsules 23, 24 and 25 may be cemented, as shown in Figure 6, along the lower inside edge of the flap. Or again, as indicated in Figure 5, a single elongated capsule 26 may be specially made to conform substantially to the dimension of the flap 20.

While it is not without the scope of my invention to form the capsule of a material containing an ingredient attractive to animals of the class for which the trap is intended, or to employ an adhesive 22 containing such an ingredient, it will be noted that the effectiveness of my structure is not dependent upon such an expedient. Rather the containers of lethal material are so located that they must be attacked and punctured by the animal in its efforts to gnaw its way from the trap.

The quantities of lethal anaesthetic employed are small, ranging in general from 1 to 6 cubic centimeters of liquid depending upon the size of the trap. Such minor quantities are effective because, when released within the trap, the vapors remain substantially confined by the trap walls until death has been produced. Such minor quantities of lethal anaesthetic released outside the trap cannot produce vapors of sufficient concentration to affect human beings or animals. As a consequence the destruction of the trap by an outside agency and the release of the lethal anaesthetic to the atmosphere of a room, for example, will be harmless. Moreover actual consumption of the capsules by human beings or animals outside the trap, if it should occur, will not produce ill effects.

The capsules, filled with lethal anaesthetic, are inherently inexpensive and may cheaply and conveniently be attached to the trap structure. It will be noted that when the blank of Figure 1 is tubed as hereinabove described, the resilient flap 20 lies against the short flap 14 with its inner bottom edge fully exposed. The attachment of the capsule or capsules may thus be effected with the cartons in the knocked down or collapsed condition and, with appropriate packing materials to protect the integrity of the capsule. The cartons may be further handled and shipped in the collapsed condition if desired. The usual practice is to erect the cartons before sale to the ultimate user, and it will be noted that when this is done the capsule or capsules are located wholly within the container and are completely protected against any destructive forces which are not effective to crush or destroy the carton itself. The lethal anaesthetic is completely enclosed in the capsule or capsules, and hence contributes no odor which would act as a deterrent to the animal's entry into the trap. The trap may be baited with any fresh bait substance available to the user at the time when he wishes to use the trap. The sealed capsules, which may be made of any substance capable of being punctured by the teeth of rodents, fully preserve the effectiveness of the lethal anaesthetic indefinitely, so that my traps do not become inoperative though stored by the user for long periods of time prior to actual use. All of the advantages of the paperboard trap construction are fully preserved, while the difficulties attendant upon the use of poisoned baits are wholly eliminated. Upon release of the volatile lethal anaesthetic, some of it soaks into the adjacent paperboard parts. This delays vaporization and prolongs the effectiveness of the anaesthetic. While I am not limited to the use of lethal materials having an initial soporific or anaesthetic effect, I prefer them because they rapidly and effectively diminish the escape activities of the animal prior to death.

Modifications may be made in my invention without departing from the spirit of it. Having described my invention in an exemplary embodiment, what I claim as new and desire to secure by Letters Patent is:

1. A paperboard animal trap comprising a plurality of walls forming a hollow body, one of said walls having an access opening, a resilient flap within said body and acting substantially to close said opening, said flap being displaceable within said body to permit entrance of an animal and resiliently biased to closed position to prevent its exit, there being a light opening between the lower edge of said flap and an adjacent body part, and a capsule of lethal material cemented to the lower inside marginal portion of said flap, said capsule containing a lethal anaesthetic.

2. The structure of claim 1 in which said capsule is a soft capsule of gelatin containing a liquid lethal anaesthetic in which gelatin is insoluble.

3. An animal trap for small animals comprising a hollow body with enclosing walls acting to inhibit atmospheric interchange between the interior and exterior of said trap, one of said walls having an access opening, and a resilient flap substantially closing said opening and displaceable within said trap for ingress, there being a light opening adjacent said flap and a frangible container of volatile lethal anaesthetic secured to said resilient flap within said body and adjacent said light opening and so located as to be of necessity broken upon destruction of so much of said flap as will provide an opening for the egress of said animal.

ALBERT B. ROESSLER, Jr.

REFERENCES CITED

The following references are of record in the file of this patent:

UNITED STATES PATENTS

| Number | Name | Date |
|---|---|---|
| 21,676 | Hill | Oct. 5, 1858 |
| 138,275 | Owen | Apr. 29, 1873 |
| 1,019,543 | Smoot | Mar. 5, 1912 |
| 1,220,593 | Berg | Mar. 27, 1917 |
| 1,858,096 | Lementy | May 10, 1932 |
| 2,359,341 | Weil | Oct. 3, 1944 |

FOREIGN PATENTS

| Number | Country | Date |
|---|---|---|
| 27,751 | Great Britain | of 1908 |